Aug. 8, 1950     W. JAGGI ET AL     2,517,881
SYSTEM OF SPEED CONTROL FOR ELECTRIC MOTORS
Filed April 8, 1949
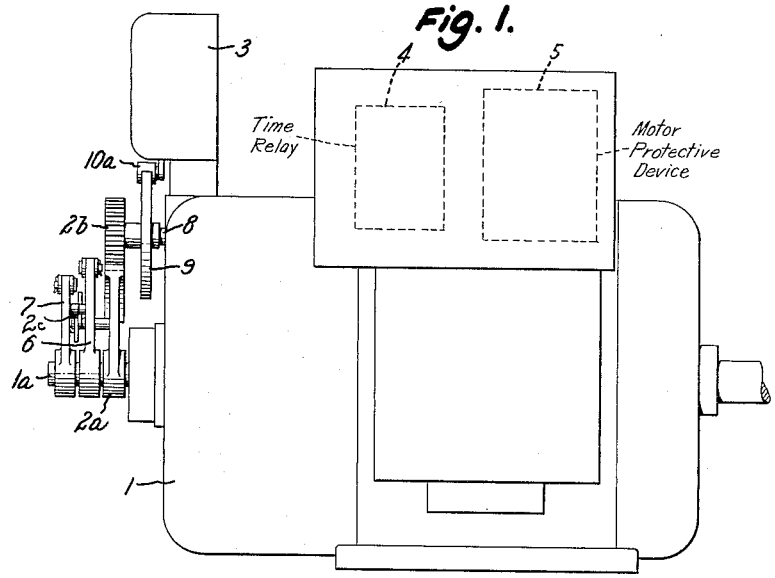
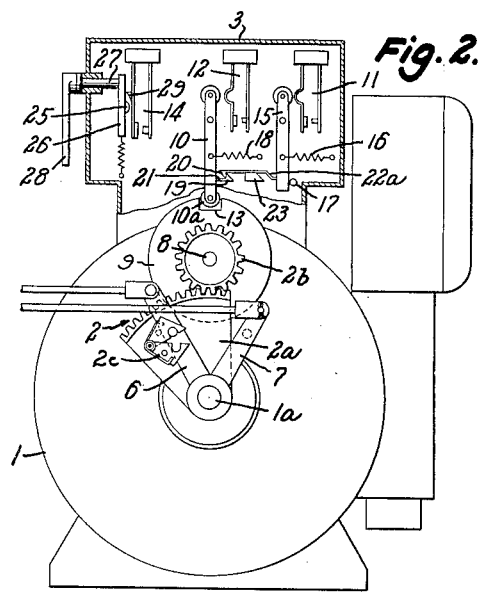
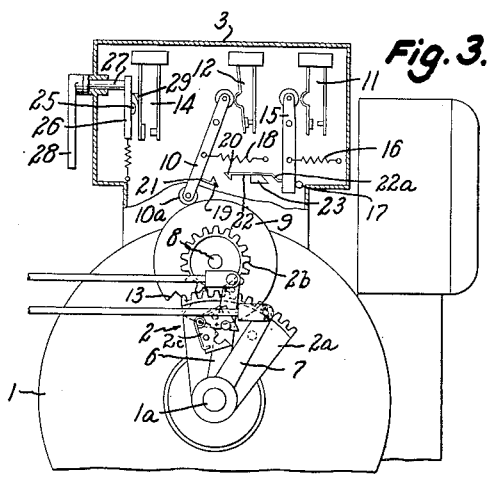
Inventors
Walter Jaggi and
Louis Blunschi
By Pierre Scheffler & Parker
Attorneys Patented Aug. 8, 1950

2,517,881

UNITED STATES PATENT OFFICE 2,517,881

SYSTEM OF SPEED CONTROL FOR ELECTRIC MOTORS

Walter Jaggi, Baden, and Louis Blunschi, Nussbaumen, near Baden, Switzerland, assignors to Aktiengesellschaft Brown, Boveri & Cie, Baden, Switzerland, a joint-stock company Application April 8, 1949, Serial No. 86,188
In Switzerland April 10, 1948

4 Claims. (Cl. 318—361)

The present invention relates to speed control systems for electric motors and particularly such motors of the collector type wherein the speed is regulated by shifting the brush yoke.

In certain types of machines provided with electric motor drive, a regulation of the R. P. M. is necessary, that permits the machine to operate with two different ranges of R. P. M. This is the case, for instance, with knitting machines where the drive must possess one regulating range for the "working" speed and also one range for the "narrowing" speed. Usually, a collector type motor is used as driving motor, and the regulation of the R. P. M. is accomplished by adjusting the brushes by means of a control device. The latter is placed on the motor and is actuated automatically by the machine according to the working program of the machine in the manner already known per se. For switching the motor in and out, a control switch mechanism is likewise provided, that is installed on the motor.

With drives of this type familiar up to the present, the control switch mechanism is operated usually by the clutch lever for the adjustment of the operating R. P. M. of the machine. The result of this, however, is that, in time, inaccuracies are observed in the switch drive and consequently periodic check-ups and readjustment of the drive members are required.

The purpose of the present invention is to provide an improved motor control device that is very simple and accurate in operation especially with regard to actuation of the control switch in drives of the above-mentioned type. According to the invention, the desired result is attained by the method that the drive of the control switch installed on the motor takes place directly from the brush adjusting shaft actuated by the control device and specifically so that the motor can be switched in only when the brush adjusting device is in the zero speed position.

A constructional example of the invention will be explained in detail in connection with the drawing. Fig. 1 shows a side elevation of a collector motor with control device for the drive of a cotton knitting machine, not shown, while in Fig. 2, the same motor is shown, viewed from the control side, in which the control switch, built on to the motor is shown in the zero speed position. Fig. 3 shows the motor control switch and the device controlling it in the working position.

In the figures, numeral 1 designates the collector motor; 2, the control device for the automatic adjustment of the "working" speed and the "narrowing" speed of the knitting machine; 3, the housing containing the control switch mechanism installed on the motor housing, for switching the motor in and out; 4, a time relay; and 5, the motor protecting device.

The automatic control device is comprised of a gear sector 2a mounted freely on a stub shaft 1a extending outwardly from the housing of motor 1, a pair of levers 6 and 7 also mounted freely on shaft 1a and which are coupled to gear sector 2a through disconnectable linkage 2c; and a pinion 2b meshed with gear sector 2a and which is keyed to a shaft 8 that extends into the motor housing and controls the angular position of the brush yoke of the motor. The levers 6 and 7 are actuated by the knitting machine and hence through the meshed sector gear 2a and pinion 2b serve to adjust the angular position of the brush yoke and thereby also the running speed of the motor. The control mechanism so far described is already well known and hence in the interest of simplifying the drawings, the brush yoke and other motor parts have been omitted from the drawings.

As previously explained, the control switch mechanism in accordance with the present invention is so arranged that the motor can be started only when the brush yoke adjusting mechanism is in the zero speed position and the switch structure by which such result is attained will now be described.

Switch housing 3 contains three sets of contacts 11, 12 and 14. Contact set 11 is actuated by the upper end of a lever 15 fulcrumed intermediate its ends, and the lower end of this lever is loaded by spring 16 in a counter-clockwise direction against a stop 17. Contact set 12 is actuated by the upper end of a lever 10 fulcrumed intermediate its ends and the lower end of this lever terminates in a roller 10a that rests within a notch 13 in a disk 9, that is mounted on and keyed to shaft 8, whenever the lever 10 and disk 9 occupy the positions shown in Fig. 2, in which position the brush yoke is in the zero speed position. A loading spring 18 is likewise associated with lever 10 urging it in a counter-clockwise direction.

The lower ends of levers 10 and 15 are linked together by means of a disconnectable coupling comprised of engageable fingers 19, 20 connected respectively to levers 10, 15 by means of straps 21, 22. When levers 10, 15 occupy the positions shown in Fig. 2 contacts 11 and 12 are open and the fingers 19, 20 are engaged thus coupling the levers 10 and 15 together. Strap 22, however, has an offset portion 22a adapted to ride against the inclined face of a stationary member 23 whenever lever 10 is shifted clockwise. This causes strap 22 to lift thus disengaging finger 20 from finger 19, and lever 15 is then restored to its position of rest against stop 17 by the loading spring 16.

Contact set 14 is actuated by means of a projection 25 affixed to an arm 26 which is secured upon the inner end of a rock shaft 27 extending outwardly through the switch housing 3. Another arm 28 secured to the outer end of shaft 27, is attached by a cable connection, not shown, directly to the knitting machine for actuation by the latter. Thus as arm 26 is rotated from the position shown in Fig. 2, the projection 25 rides against a companion projection 29 carried by the movable contact member of contact set 14 and moves the contacts to closed position.

Operation of the switching mechanism is as follows: When all components occupy the positions shown in Fig. 2, the contacts of all three contact sets are open and the motor I is at rest. To start the motor, lever 6 is shifted clockwise. Gear sector 2a likewise moves clockwise causing counter-clockwise rotation of pinion 2b and disc 9 whereupon the lower end of lever 10 rides out of the recess 13 onto the periphery of the disc 9 and is shifted in a clockwise direction. Because of the coupling between levers 10 and 15 the latter is likewise moved in a clockwise direction thus closing contact set 11 which completes the starting circuit for the motor through the motor protective device 5. After lever 10 has moved through an angle of about 20°, the upper end thereof will have moved sufficiently to actuate switch contacts 12 to closed position and this is followed by a separation of fingers 19, 20 thus permitting contact set 11 to reopen. In any operating position of the motor, such as the position shown in Fig. 3, contact set 12 controlling the running circuit of the motor remains closed and contact set 11 open.

The contact set 14 serves to adjust the machine according to the program and when actuated to a closed position by the machine at the proper time functions in conjunction with the time delay relay 4 to switch out the motor 1. The running to a stop by the knitting machine can be suited automatically to the working program of the machine by appropriate adjustment of the time delay relay 4. After the motor has been switched out by closure of contact set 14, it will be evident that it cannot be restarted until the brush yoke adjusting shaft 8 and disc 9 have been returned to the starting position shown in Fig. 2 where fingers 19 and 20 become reengaged and recouple the contact controlling levers 10 and 15. Hence it becomes impossible to switch in the stopped motor with the brush yoke in any position other than the zero speed position.

In conclusion, while the invention has been described in relation to a preferred construction for obtaining the desired result it will be evident that various modifications in the construction and arrangement of components may be made by those skilled in the art without, however, departing from the spirit and scope of the invention as defined in the appended claims.

We claim:

1. In an electric motor drive for knitting machines and the like wherein speed of the driving motor is adjusted by shifting the angular position of a brush yoke in accordance with the working program of the machine, the combination comprising a rotatable brush yoke adjusting shaft on said motor, a disc secured to said shaft and rotated thereby, said disc including a notched portion in the periphery thereof corresponding to zero speed of the motor, control switch means for connecting said motor to a source of electric power, and a lever for actuating said switch means, one end of said lever being urged into engagement with the periphery of said disc and actuatable only upon movement of said lever end into and out of the notched portion thereof.

2. An electric motor drive as defined in claim 1 wherein said control switch means comprises first and second sets of contacts for energizing respectively starting and running circuits of said motor, and wherein initial movement of said lever end out of the notched portion of said disc effects closure of said first set of contacts, and further movement of said lever end effects closure of said second set of contacts and reopening of said first set.

3. An electric motor drive as defined in claim 2 and which further includes an additional set of switching contacts controlled directly from the machine in accordance with the work program and which contacts in conjunction with a time relay open the running circuit of said motor.

4. In an electric motor drive for knitting machines and the like wherein speed of the driving motor is adjusted by shifting the angular position of a brush yoke in accordance with the working program of the machine, the combination comprising a rotatable brush yoke adjusting shaft on said motor, a disc secured to said shaft and rotated thereby, said disc including a notched portion in the periphery thereof corresponding to zero speed of the motor, control switch means for connecting said motor to a source of electric power, said switch means including a first set of lever actuated contacts for controlling a starting circuit of said motor and a second set of lever actuated contacts for controlling a running circuit of said motor, and means coupling the levers controlling said sets of contacts, said coupling means providing automatic disengagement of said levers upon a predetermined movement of the lever controlling said second set of contacts, and the lower end of last said lever being urged into engagement with the periphery of said disc and actuatable only upon movement of said lever end into and out of the notched portion thereof.

WALTER JAGGI.
LOUIS BLUNSCHI.

REFERENCES CITED

The following references are of record in the file of this patent:

UNITED STATES PATENTS

| Number | Name | Date |
|---|---|---|
| 1,128,005 | Kimble et al. | Feb. 9, 1915 |
| 1,860,183 | Hull | May 24, 1932 |